United States Patent [19]

Keller et al.

[11] Patent Number: 4,868,390
[45] Date of Patent: Sep. 19, 1989

[54] PYROELECTRIC SENSOR WITH HIGH SENSITIVITY

[75] Inventors: Hans J. Keller, Staefa, Switzerland; Fredrick Villers, Ormond Beach, Fla.

[73] Assignee: ELTEC Instruments, Inc., Daytona Beach, Fla.

[21] Appl. No.: 156,395

[22] Filed: Feb. 16, 1988

[51] Int. Cl.$^4$ .................................................. G01J 5/24
[52] U.S. Cl. .................................... 250/338.3; 250/349
[58] Field of Search ............................ 250/338.3, 349

[56] References Cited

U.S. PATENT DOCUMENTS 4,198,564  4/1980  Baker et al. ...................... 250/338.3

OTHER PUBLICATIONS

Altmann et al., "Fast Current Ampl. for Bkg-Limited Operat. . . . ", J. Phys. E. Sci. Instr., vol. 13, No. 12, (Dec. 1980), pp. 1275–1277.

Primary Examiner—Carolyn E. Fields
Assistant Examiner—Richard Hanig
Attorney, Agent, or Firm—Duckworth, Allen, Dyer & Doppelt

[57] ABSTRACT

A pyroelectric sensor circuit arrangement for reducing noise and increasing sensitivity has a main current amplifier with a high feedback resistor connected to receive input from an electrode of a pyroelectric element, and includes a compensation amplifier in a unity gain amplifier configuration connected to a common power source with the main amplifier. The compensation amplifier is connected to discharge transients from the pyroelectric element when electrode voltage exceeds the positive voltage or goes below the negative voltage of the power source. A pair of anti-parallel diode or similar component is connected between the main amplifier input and the compensation amplifier output.

12 Claims, 1 Drawing Sheet

PYROELECTRIC SENSOR WITH HIGH SENSITIVITY

The present invention relates to an arrangement for a radiation sensor with at least one pyroelectric element. The electrical signals produced by the pyroelectric element are intensified by means of a electronic amplifier and fed to an output terminal.

BACKGROUND OF THE INVENTION

Such sensors are used to convert radiation of any sort into a electrical signal. The radiation is absorbed in or on a pyroelectric element, and the resulting temperature change leads to a shift in the electrical charge of the pyroelectric element. Such radiation sensors are called thermal sensors, because they make use of the secondary thermal change in these sensor elements. Such sensors are used for the detection of different kinds of radiation. They are specifically useful in situations where only expensive or complicated alternatives exist, or when alternative sensors have other disadvantages. This is specifically true in the thermal infrared range.

A pyroelectric element is made from a piece of pyroelectric material and includes two electrodes in such an arrangement, that an internal shift of the electrical charge results in an electrical charge on these electrodes. As pyroelectric materials, a number of substances can be used, for example lithium tantalate, sodium nitrite, TGS, PZT, PVF and others. These are either crystalline substances, ceramics or plastics. They may have an intrinsic pyroelectric effect or may have been made pyroelectric by proper processing in a way that a temperature change results in an internal shift of the electrical charge. There are a number of possibilities to make sensors from such pyroelectric elements. A pyroelectric element is formed by two adjacent electrodes and the pyroelectric material in between. More than one element can be produced on one piece of pyroelectric material, and it is possible that several elements have a common electrode. By means of such arrangements, it is possible to make any sort of linear or two dimensional arrangement of elements, wherein some of the elements may be connected in parallel or in series with others. It is also possible to use a separate piece of pyroelectric material for each pyroelectric element, and to make any sort of arrangement from an arbitrary number of such elements. It is specifically advantageous to use thin, disc-shaped pieces of pyroelectric material, wherein electrodes or electrode patterns are dèposited on both large surfaces. At least one on these large surfaces is exposed to the incident radiation, werein the electrode on said surfaces is at least partially absorbing the incident radiation in order to convert it into heat. However, this electrode may as well be partially or completely transparent to the incident radiation. In this case, the radiation enters into the pyroelectric material and is either absorbed by bulk absorption or multiple reflection and converted into heat.

It is popular to use such sensor elements as single elements or arrangements of two or more elements wherein each element has its own electric output. It is also very advantageous to connect two or more elements with inverse polarity in series or in parallel wherein said elements may be arranged on top of each other or side by side. In such an arrangement, some of the elements may be shielded from the incident radiation. Such arrangement are specifically useful to suppress signals produced by the temperature changes of the environment. The parallel opposed dual detector is such a typical arrangement.

In a practical application, the pyroelectric elements are mechanically fixed in a way that the heat flow to the environment is as low as possible. It has proven to be advantageous to fix these elements by means of small wire springs or to fix them by means of an adhesive only on one or more small areas. Such a fixture needs also to consider the mechanical forces created by temperature changes and vibrations.

The electrical signal appears in form of an electrical charge on the electrodes. An electrical resistor can be connected in parallel to the pyroelectric element to allow a discharge of said electrical charge. The discharge current produces an electrical voltage over this resistor. Instead of such a resistor, the material itself can be made electrically conductive. It is also possible to use similar resistive elements such as semiconductor diodes, shockley diodes, etc. In a practical application, a pyroelectric element of for example 2×2 mm size and 0.05 mm thickness is used, with electrodes on both large surfaces. These two electrodes create an electrical capacitance of approximately 30 pf. Such an arrangement has an electrical impedance of approximately 10E10 ohms at a frequency of one hertz. A resistive element connected in parallel to such a pyroelectric element needs to have a resistance value in the same order of magnitude to prevent signal losses. This high impedance signal needs to be converted to a lower impedance signal by means of an impedance converter. Junction as well as MOS field effect transistors are commonly used as impedance converters.

It is also possible to use a so-called charge amplifier to make the small electrical charges of the pyroelectric element useful. Such charge amplifiers have an input with an extremely high electrical impedance. If used in conjunction with a pyroelectric element, the output voltage is proportional to the electrical charge on the pyroelectric element. To make such charge amplifiers responsive continous signals, they need to be discharged repeatedly. This can be accomplished by means of electric or electronic switch connected across the pyroelectric element. As the electrical impedance of a pyroelectric element as well as of a charge amplifier are never infinite in practice, the discharge can be made deliberately by means of these imperfections. If a fedback resistor is used between the pyroelectric element and the output of the charge amplifier, a so called current amplifier is formed. In a current amplifier, the current produced by the discharge of the electrical charge is converted into an output voltage. Therefore, the output voltage is proportional to the change of the electrical charge on the pyroelectric element or, because the change of the electrical charge is proportional to the temperature change or the change of the incident radiation, the output voltage of such a sensor is proportional to the change of the incident radiation. A large number of such sensor arrangements have proved to be useful in the practical application and are widely used for the detection of thermal radiation. Typical applications are found in non-contact thermometers. These are instruments for the remote determination of a surface temperature, and make use of the blackbody radiation of an object in the infrared. In such an application, one or more pyroelectric elements are used in conjunction with an impedance converter or a current amplifier and an appropriate radiation filter in form of a compact and hermetically sealed sensor. Such sensors are commonly produced under the name pyroelectric detectors or pyroelectric sensors. A useful application of this non-contact temperature measurement principle has been found in the determination of the presence or motion of people. Due to the body temperature, people can easily be detected in front of a cooler or warmer background. Such instruments are called passive infrared detectors and used as intruder alarm sensors or to control light, air conditioning or other comfort functions.

Although such pyroelectric sensors have found a large variety of applications, their sensitivity is still far below the theoretical limit or the performance achievable with quantum detectors. For one thing this is caused by the fact that a thermal detector makes use of a secondary effect and inevitable losses that come along with that principle. On the other hand, there are limitations in the electrical amplifiers used in conjunction with such detectors. In a practical application, the electrical charges on a pyroelectric element are so small that they can hardly be discriminated from electrical noise. Such noise sources are the resistors of the discharge of feedback resistor as well as the current and voltage noies of the impedance converter or amplifier. These three noise sources have their origin in fundamental physical processes and can therefore not be improved beyond certain limits.

SUMMARY OF THE INVENTION

It is an objective of the present invention to provide an arrangement of pyroelectric elements, resistors and amplifiers to reduce the noise sources as far as possible, and to provide a sensor element with the highest possible sensitivity to the radiation and the smallest possible noise signal.

This is accomplished by means of a current amplifier, wherein the feedback resistor has such a high resistor value that its noise can be neglected, and including a compensation amplifier that eliminates or reduces the input current noise.

DETAILED DESCRPTION oF PREFERRED EMBODIMENTS

The invention is described in terms of an illustrative radiation sensor.

Figure 1:
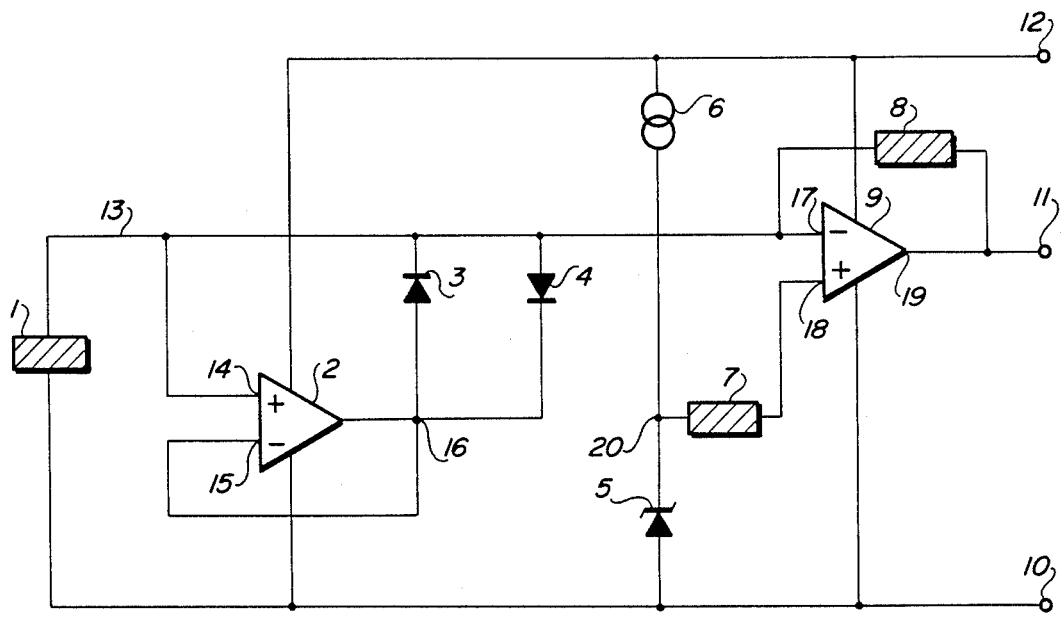
FIG. 1 is a circuit diagram of a sensor in accordance with the invention.

FIG. 1 shows such a circuit arrangement in detail. The pyroelectric element 1 is connected between the negative rail 10 and the wire connection 13. The wire 13 leads to the positive input 14 of the compensation amplifier 2 and also to the negative input 17 of the main amplifier 9. The compensation amplifier 2 as well as the main amplifier 9 are standard differential operational amplifiers. Both amplifiers are operated from the positive supply voltage 12 and the negative rail 10. In the compensation amplifier 2, the output 16 is connected with the negative input 15 to form an amplifier with unity gain. The output of the compensation amplifier 2 is connected by means of the diodes 3 and 4 with the pyroelectric element over the wire connection 13. Also, a reference voltage is provided on the point 20, for example by means of the zener diode 5 and the current source 6. This reference voltage is supplied through the resistor 7 onto the positive input 18 of the main amplifier 9. The output 19 of the main amplifier is connected with the signal output 11 of the sensor arrangement. The feedback resistor 8 is connected between the output 19 and the negative input 17 of the main amplifier 9.

The operation of this arrangement is as follows: The pyroelectric element 1 produces an electrical signal on its output wire 13 according to the incident radiation. A similar signal appears also on the output 16 of the compensation amplifier 2. It is identical with the signal on 13 except for the imperfections of the amplifier 2. Therefore, the electrical voltage over the two diodes 3 and 4 is zero or almost zero. As the diodes 3 and 4 are passive elements, the current flow through the diodes 3 and 4 is also zero or almost zero. Therefore, the diodes 3 and 4 have no effect on the operation of the circuit. The output signal of the pyroelectric element is also fed by means of the wire 13 to the main amplifier.

Except for unwanted parasitic effects, the output voltage at point 11 is identical to the current produced by the pyroelectric element multiplied with the resistor value 8. If the resistor value of the resistor 8 is increased, the output voltage on 11 can be increased to any desired magnitude. If isolated input transistors are used in the amplifiers 2 and 9, the resistor 8 can be increased up to the order of magnitude of the electrical conductivity of the materials used. In a practical application, the value of the resistor 8 can be between 10E11 or 10E13 ohms. Hoewver, such amplifiers with isolated inputs have the disadvantage of being easily destroyed by high electrical voltages. This is of specific importance because the pyroelectric element 1 can easily produce voltages on the order of 100 volts or more upon changes of the ambient temperature. In such cases, the compensation amplifier circuit becomes operational.

When the signal voltage on wire connection 13 exceeds the positive voltage on connection 12 or goes below the negative voltage of rail 10, the output voltage at compensation amplifier output 16 cannot track the voltage on 13 anymore. If this occurs, the voltage over the diodes 3 and 4 raises above zero and either the diode 3 or the diode 4 becomes conductive. Thereby, the charge on the pyroelectric element on the wire connection 13 is discharged until the time when the voltage difference between line 13 and output 16 becomes low enough, the diodes 3 and 4 stop being conductive, and the normal operating conditions are reached again.

Figure 2:
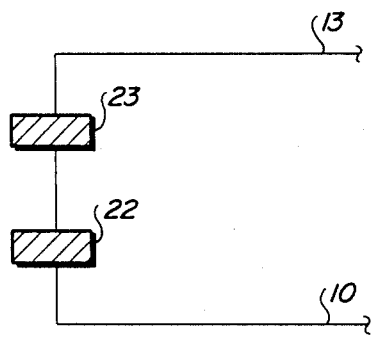
FIG. 2 shows a series modification to the sensor of FIG. 1.

Instead of the pyroelectric element 1, it is also possible to use an arrangement of two or more pyroelectric elements. FIG. 2 shows such an arrangement with two elements 22 and 23 connected in series in place of the element 1 between the connections 10 and 13. These two elements 22 and 23 can be connected with the same or with opposite polarity. It is also possible to use more than two elements in series.

Figure 3:
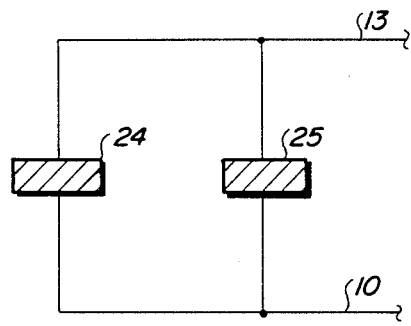
FIG. 3 shows a parallel modification to the sensor of FIG. 1.

FIG. 3 shows a parallel arrangement of pyroelectric elements 24 and 25. This arrangement can be used instead of one single pyroelectric element in an arrangement according to FIG. 1. The parallel connection of two or more pyroelectric elements can be accomplished by using the same or opposite polarities. The latter case is called parallel opposed circuit.

Figure 4:
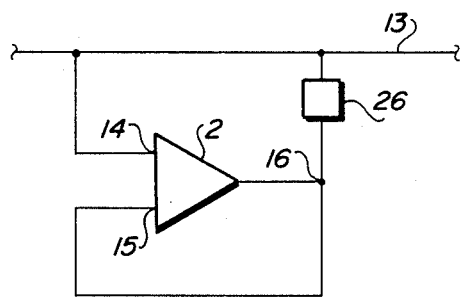
FIG. 4 shows an alternative embodiment of sensor using a resistor in place of diodes.

It is also possible to use other elements instead of the diodes 3 and 4. Specifically, this could be zener diodes, shockley diodes or a normal resistor 26, as shown in FIG. 4. It is only important that a current can flow between line 13 and output 16 when the voltage differential between this two points is different from zero, and that no or only an unsignificant current flows when the voltage between 13 and 16 is zero or almost zero. In a practical application, the voltage differential between 13 and 16 can very often not be made zero. Therefore it is advantageous to use elements instead of the diodes 3 and 4 that still provide very low current when the voltage differential is low, such as small geometry diodes or resistors with values on the order of 10E8 and 10E12.

It is also possible to replace the elements 5 and 6 in FIG. 1 with other elements such as a resistor network or an active element such as an integrated voltage regulator. It is only of importance, that a reference voltage at point 20 provides safe operating conditions for the amplifier 9 well within its specification. However, this reference voltage is not of any importance for the proper operation of the circuit as described in this invention.

It is also possible to eliminate the resistor 7 and to replace it by a simple wire connection. Its purpose is only to provide symmetrical conditions for the inputs of the amplifier 9. Therefore it has normally the same resistor value as the resistor 8. However, as the symmetrical conditions on the inputs of the amplifier 9 may also be determined by parasitic effects, such as stray capacitance or leakage current, there is no need for the resistor 7 and it may well perform without it. Sometimes, the resistor 7 is used to improve the power supply rejection ratio. If this is not required in a specific application, the resistor 7 can also be eliminated.

What is claimed is:

1. A pyroelectric sensor element having a high sensitivity to radiation and a low noise output signal, comprising:

a power source having positive and negative terminals;

a pyroelectric element having a piece of pyroelectric material connected between two electrodes to develop an electrical signal across said electrodes responsive to radiation incident on said material;

a current amplifier in the form of a first operational amplifier connected to said power source and having a first input terminal connected directly to one of said electrodes, a second input terminal for receiving a reference voltage signal, and an output terminal; said current amplifier including a feedback resistor connected between said output terminal and said first input terminal of high resistance so that amplifier noise is negligible;

a compensation amplifier in the form of a second operational amplifier connected to said power source and having a first input terminal connected directly to said one electrode, and an output terminal; and discrete circuit component means connected directly between said output terminal of said compensation amplifier and said first input terminal of said first operational amplifier, said compensation amplifier being operational and said component means functioning to inhibit input current noise to said current amplifier for protecting said current amplifier from overloading when the voltage of said electrode exceeds the voltage of said positive terminal or falls below the voltage of said negative terminal by acting to maintain the voltage at said first input terminal of said current amplifier at substantially the same voltage as the voltage at said output terminal of said compensation amplifier, with minimum voltage drop across said component means and minimum noise-generating current flow therethrough.

2. A sensor as in claim 1, wherein said second operational amplifier further comprises a second input terminal connected to its output terminal in the form of a unity gain amplifier.

3. A sensor as in claim 2, wherein said discrete component element means comprises oppositely directed diodes connected in parallel between said output terminal of said compensation amplifier and said first input terminal of said current amplifier.

4. A sensor as in claim 2, wherein said circuit element means comprises a resistor connected between said output terminal of said compensation amplifier and said first input terminal of said current amplifier.

5. A sensor as in claim 1, further comprising a second pyroelectric element connected in series with said first pyroelectric element.

6. A sensor as in claim 1, further comprising a second pyroelectric element connected in parallel with said first pyroelectric element.

7. A sensor as in claim 2, further comprising a second pyroelectric element connected in series with said first pyroelectric element.

8. A sensor as in claim 2, further comprising a second pyroelectric element connected in parallel with said first pyroelectric element.

9. A sensor as in claim 3, further comprising a second pyroelectric element connected in series with said first pyroelectric element.

10. A sensor as in claim 3, further comprising a second pyroelectric element connected in parallel with said first pyroelectric element.

11. A sensor as in claim 4, further comprising a second pyroelectric element connected in series with said first pyroelectric element.

12. A sensor as in claim 4, further comprising a second pyroelectric element connected in parallel with said first pyroelectric element.

* * * * *